Feb. 26, 1963 A. KÖTTNER 3,078,811
CONVEYOR ASSEMBLY FOR CONVEYING OF CARCASSES
TO A CUTTING DEVICE
Filed Feb. 15, 1961 2 Sheets-Sheet 1
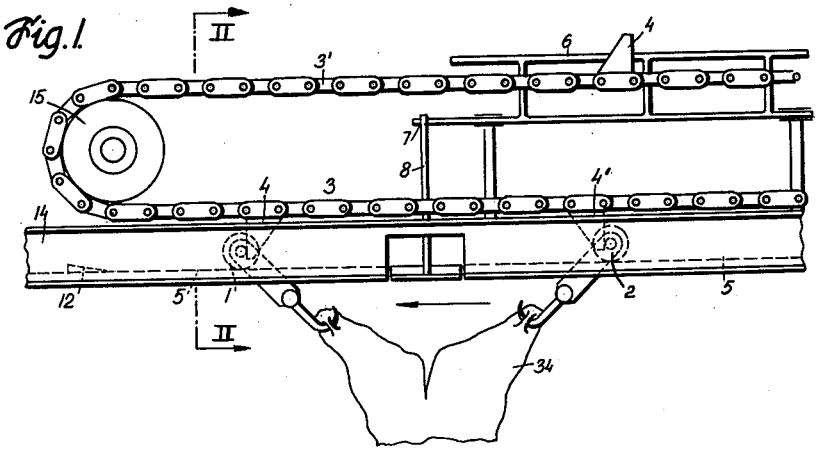
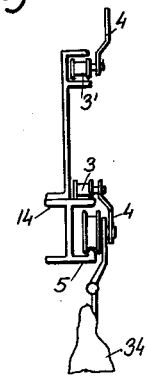
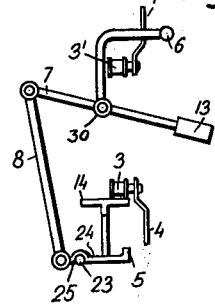
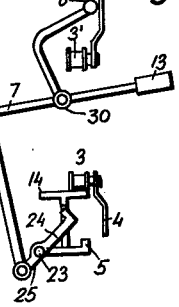
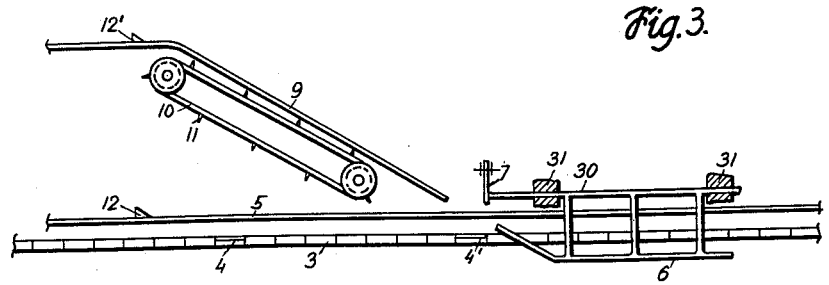
INVENTOR.
Antonin Köttner
BY United States Patent Office 3,078,811
Patented Feb. 26, 1963

3,078,811
CONVEYOR ASSEMBLY FOR CONVEYING OF CARCASSES TO A CUTTING DEVICE
Antonín Köttner, 42 Hybesova, Slapanice, near Brno, Czechoslovakia
Filed Feb. 15, 1961, Ser. No. 112,135
Claims priority, application Czechoslovakia Feb. 19, 1960
2 Claims. (Cl. 104—172)

My invention relates to a conveying apparatus for carcasses operated on in meat processing plants and more particularly to conveying apparatus delivering carcasses to be cut in half.

In apparatus of that type as used up to this time the cutting operation was performed on carcasses while they moved in suspended position on a rail. This cutting of the moving carcass could not be performed easily and was often dangerous to the operator.

It is an object of this invention to avoid the said and other disadvantages of the known conveying apparatus and to provide a conveying apparatus which easily, safely and continuously operates and in which the carcass while being cut is at rest.

The said and other objects of my invention will be more fully understood from the following specification when read with the accompanying drawing in which one embodiment of my new conveyor assembly is illustrated.

In the drawing:

FIG. 1 is an elevational view of the assembly,

FIG. 2 is a sectional view along line II—II of FIG. 1,

FIGS. 3 and 4 are plan views showing two different positions of the assembly,

FIGS. 7 and 8 are side views of the lever system, in two extreme positions, controlling said switch means.

Figure 4:
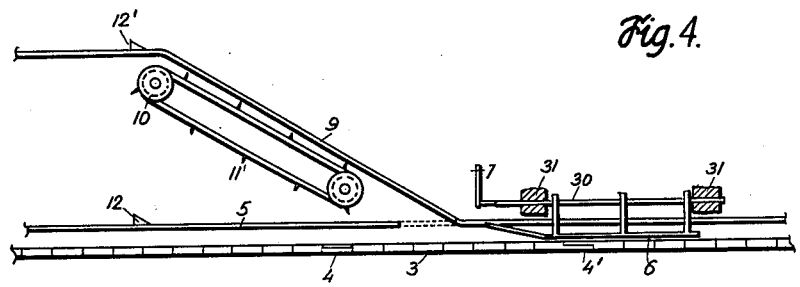

As illustrated in FIGS. 1 and 2 the carcass 34 to be processed is suspended by its hind legs from trolleys 1 and 2 which move in the direction indicated by the arrow on a main rail 5 supported by a frame work 14. The leading trolley 1 is driven by one of a plurality of dogs 4 mounted on an endless driving chain 3, 3' guided by wheels 15 (one only being shown). Each driving dog 4 is paired with one of a plurality of distancing dogs 4' also carried by the chain 3 and these dogs 4, 4' keep the hind legs of the carcass spread apart. The forward moving branch 3 of the chain is supported by said frame work 14 while a superstructure thereof supports the returning branch 3'.

To the left from the chain 3, 3' is the customary cutting device (not shown) for the carcass. About nine feet in front thereof a side rail 9 (FIGS. 3 and 4) branches from the main rail 5 and switching means are provided to permit the leading trolley 1 to continue to move on main rail 5 while the trailing trolley 2 is diverted to the side rail 9. An auxiliary driving chain 10 extending along the side rail 9 is provided with a plurality of dogs 11 which drive the diverted trolley 2 on the side rail 9. The forward moving trolleys 1, 2 pass stops or retaining members 12, 12' mounted on the rails 5 and 9, respectively, and these stops, located in front of the cutting device, prevent any return movement of the trolleys during the cutting operation.

The switch operating the side rail 9 may be of any known construction and by itself is not the object of the invention. In the shown embodiment the switch is operated by a lever system actuated by the return branch 3' of the chain.

Figure 5:
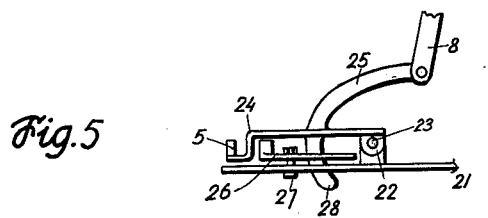
FIGS. 5 and 6 are an elevational and a top view, respectively, of switch means used in the assembly.
Figure 6:
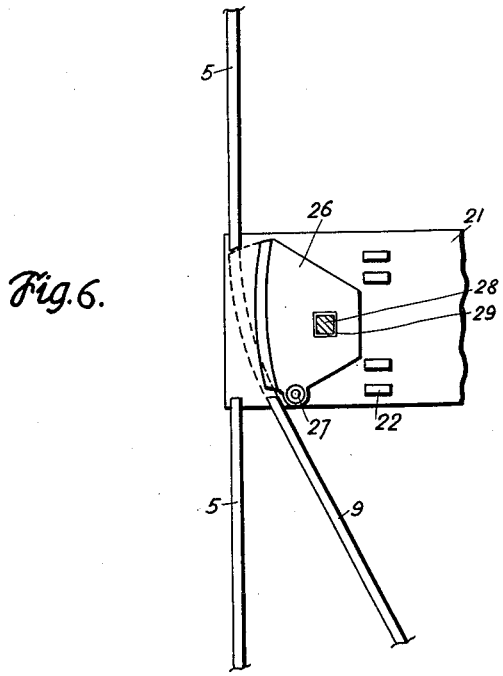

The switch may be constructed as shown in FIGS. 5 and 6. A base plate 21 is mounted on the frame work 14 offset from the main rail 5. This plate supports in bearings 22 a shaft 23 which swingably holds an upper plate 24 on which rests a connecting or switching portion of the main rail 5 and which can be swingably raised or lowered by a lever 25 actuated by the bar 8. Between the base plate 21 and the upper plate 24 is an intermediate plate 26 which is mounted on plate 21 turnably in a horizontal plane around the bolt 27 and which holds a connecting or switching portion of the side rail 9. A dog 28 fixed to the upper plate 24 engages an opening 29 in the intermediate plate 26 and a corresponding slot in the base plate 21.

In the position shown in FIG. 5 the switch is set for a straight course on the main rail 5, the upper plate 24 with the switching portion of rail 5 being in horizontal position and the intermediate plate 26 with the switching portion of rail 9 being turned by said dog 28 into the non-operating position shown in full lines in FIG. 6. When the upper plate 24 is raised by actuating the lever 25, the intermediate plate 26 with the switching portion of rail 9 is turned around the bolt 27 by the action of the dog 28 and said switching portion of rail 9 enters the operative position shown in dotted lines in FIG. 6. In this FIG. 6 the upper plate 24 is not shown in order to expose the intermediate plate 26 to full view. It will be well understood that the switching means may be of any other known type.

The control of the switch mechanism is initiated by the dogs 4 (see FIG. 1) when the same return with the branch 3' of the conveyor chain and is performed by the lever assembly schematically shown in FIGS. 7 and 8 in their two end positions. These figures show again the above described upper plate 24 tiltable around the bolt 23 by means of the rod 8. The rod 8 is linked to a bell crank lever 7 which is pivotably mounted on shaft 30 and is provided on its outer end with a counterweight 13 urging the lever mechanism into the position shown in FIG. 7. The extended shaft 30 (see FIGS. 3 and 4) turns in bearings 31 mounted upon the frame work 14 and is rigidly connected to a guiding ledge 6 (FIGS. 3, 4, 7 and 8) which lies in the path of the dog 4 returning with the chain branch 3'. The location of the dogs 4, 4' and the shape and length of the guiding ledge 6 will insure a proper operation of the switch means to effect, as described above, the leading trolley 2 to continue its movement on the main rail 5 while the trailing trolley 2' is diverted to the side rail 9.

The assembly operates as follows:

The carcass 14 suspended by its hind legs from the trolleys 1, 2 is moved along the main rail 5 by the action of the dogs 4, 4' mounted on the endless chain 3, 3'. The switch means are originally held by the counterweight 13 in a position keeping the main rail 5 continuous and the ledge 6 is held in the position shown in FIGS. 3 and 7. After the leading trolleys 1 has passed the switch, the dog 4 returning with the upper branch 3' of the chain strikes against the ledge 6 and displaces the same into the position shown in FIGS. 4 and 8 causing the lever mechanism to turn about the pivots 23 and 30 whereby the side rail 9 is switched into the main rail 5. Thereupon the trailing trolley 2 is diverted upon the side rail 9 while the carcass 14 is still pulled forward by the leading trolley 1. This trolley 1, however, soon thereafter disengages from the dog 4 and the carcass turns slowly about its vertical axis. The trailing trolley 2 is then caught by one of the dogs 11 of the auxiliary chain 10 and the carcass is further turned until the trolleys 1, 2 pass the stops 12, 12', respectively. These stops prevent any return movement of the carcass which now may be cut in halves by the not shown customary cutting device. Each of the separated halves of carcass may then be further transported on extensions of the rails 5 and 9.

The described device permits an easy and continuous operation, the carcasses and later their separated halves remaining constantly suspended from the same trolleys.

While one specific embodiment of my invention has been shown and described in detail to illustrate the application of the principles of my invention, it will be understood that the same may be otherwise embodied without departing from such principles.

What I claim as my invention is:

1. In a conveying apparatus for meat processing plants for delivery of carcasses to a cutting apparatus the improvement comprising in combination
   (a) a main conveyer track,
   (b) a plurality of trolleys moving on said main track and provided with means to suspend therefrom a carcass by its hind legs,
   (c) an endless driving chain running parallel to said main track,
   (d) dogs attached to said chain to drive paired trolleys in spaced relation to keep the suspended hind legs spread apart, one trolley of each pair being the leading trolley and the other the trailing trolley,
   (e) a side track switchably branching off from said main track,
   (f) switch means for said main and said side track,
   (g) control means actuated by said chain for said switch means switching in the side track after the leading trolley has passed the switch to continue on the main track and forcing the trailing trolley to continue on the side track until the carcass is turned substantially by ninety degrees to face the cutting apparatus,
   (h) and retaining means holding the trolleys with the carcass in said turned position for the cutting operation.

2. A conveying apparatus according to claim 1 comprising an auxiliary endless driving chain moving the trailing trolleys along the side track to their retaining means.

References Cited in the file of this patent

UNITED STATES PATENTS

| | | |
|---|---|---|
| 1,337,121 | Desautels | Apr. 13, 1920 |
| 1,865,788 | Raymond | July 5, 1932 |
| 2,517,326 | LeFiell | Aug. 1, 1950 |
| 2,551,155 | Orling | May 1, 1951 |
| 2,875,704 | Yates | May 3, 1959 |